United States Patent
Takazawa

(10) Patent No.: US 8,826,176 B2
(45) Date of Patent: Sep. 2, 2014

(54) INFORMATION PROCESSING APPARATUS AND CONTROL METHOD

(75) Inventor: Satoshi Takazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 12/731,447

(22) Filed: Mar. 25, 2010

(65) Prior Publication Data

US 2010/0269063 A1 Oct. 21, 2010

(30) Foreign Application Priority Data

Apr. 15, 2009 (JP) .................................. 2009-099405

(51) Int. Cl.
*G06F 3/048* (2013.01)

(52) U.S. Cl.
USPC ........................................................ 715/810

(58) Field of Classification Search
USPC ........................................................ 715/810
See application file for complete search history.

(56) References Cited

U.S. PATENT DOCUMENTS

| | | | |
|---|---|---|---|
| 2002/0004933 A1* | 1/2002 | Dzoba et al. | 717/4 |
| 2002/0083431 A1 | 6/2002 | Machida | 717/174 |
| 2003/0061333 A1* | 3/2003 | Dean et al. | 709/223 |
| 2005/0071771 A1* | 3/2005 | Nagasawa et al. | 715/765 |
| 2005/0165922 A1* | 7/2005 | Hatano | 709/223 |
| 2007/0245039 A1 | 10/2007 | Dahneke et al. | 710/15 |
| 2008/0040392 A1 | 2/2008 | Sugishita | 707/104.1 |
| 2008/0256614 A1 | 10/2008 | Hagiuda | 726/5 |

FOREIGN PATENT DOCUMENTS

| | | | |
|---|---|---|---|
| JP | 7-282079 | 10/1995 | G06F 17/30 |
| JP | 2007-213363 A | 8/2007 | |
| JP | 2008-41057 A | 2/2008 | |
| JP | 2008-66887 A | 3/2008 | |
| JP | 2008-262369 A | 10/2008 | |

\* cited by examiner

*Primary Examiner* — Weilun Lo
*Assistant Examiner* — Peiyong Weng
(74) *Attorney, Agent, or Firm* — Fitzpatrick, Cella, Harper & Scinto

(57) ABSTRACT

Upon receiving a menu display request, a plug-in dynamically generates a menu. The module of the plug-in generates the contents of the menu. Each plug-in has specific menu generation processing. The contents of menus generated by respective plug-ins are merged to display the menu.

10 Claims, 14 Drawing Sheets

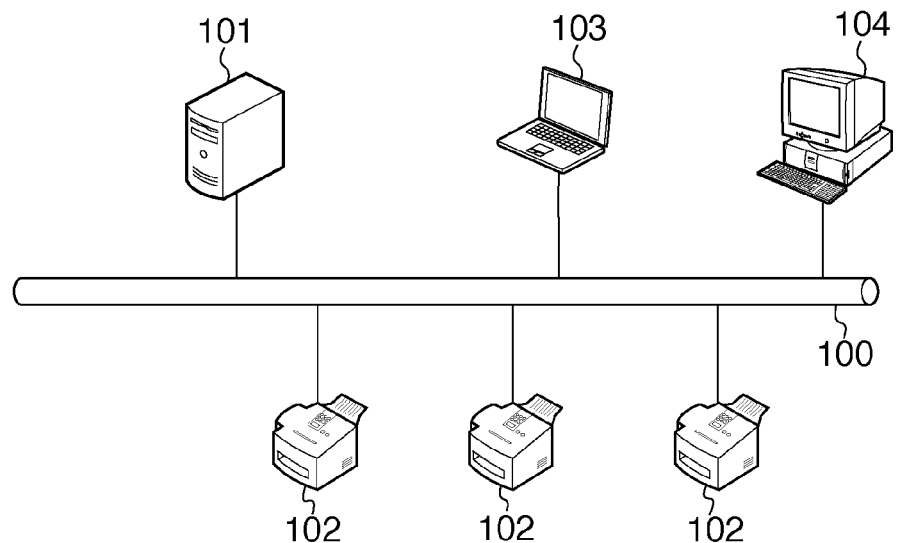
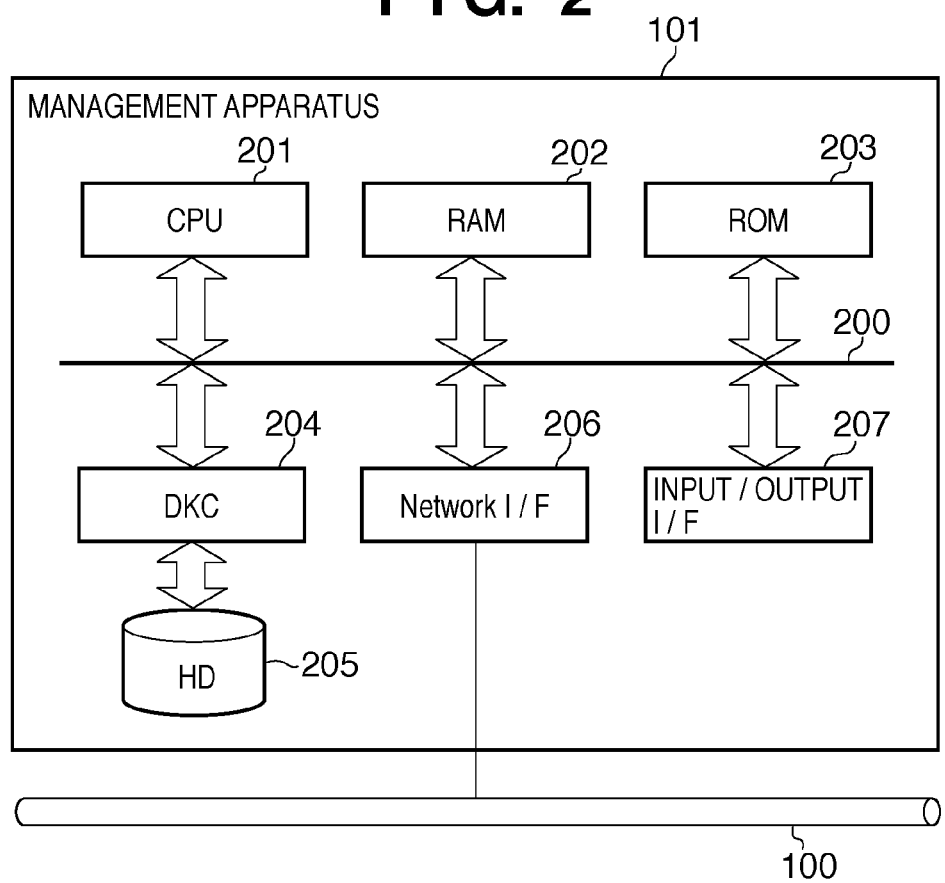

F I G. 3
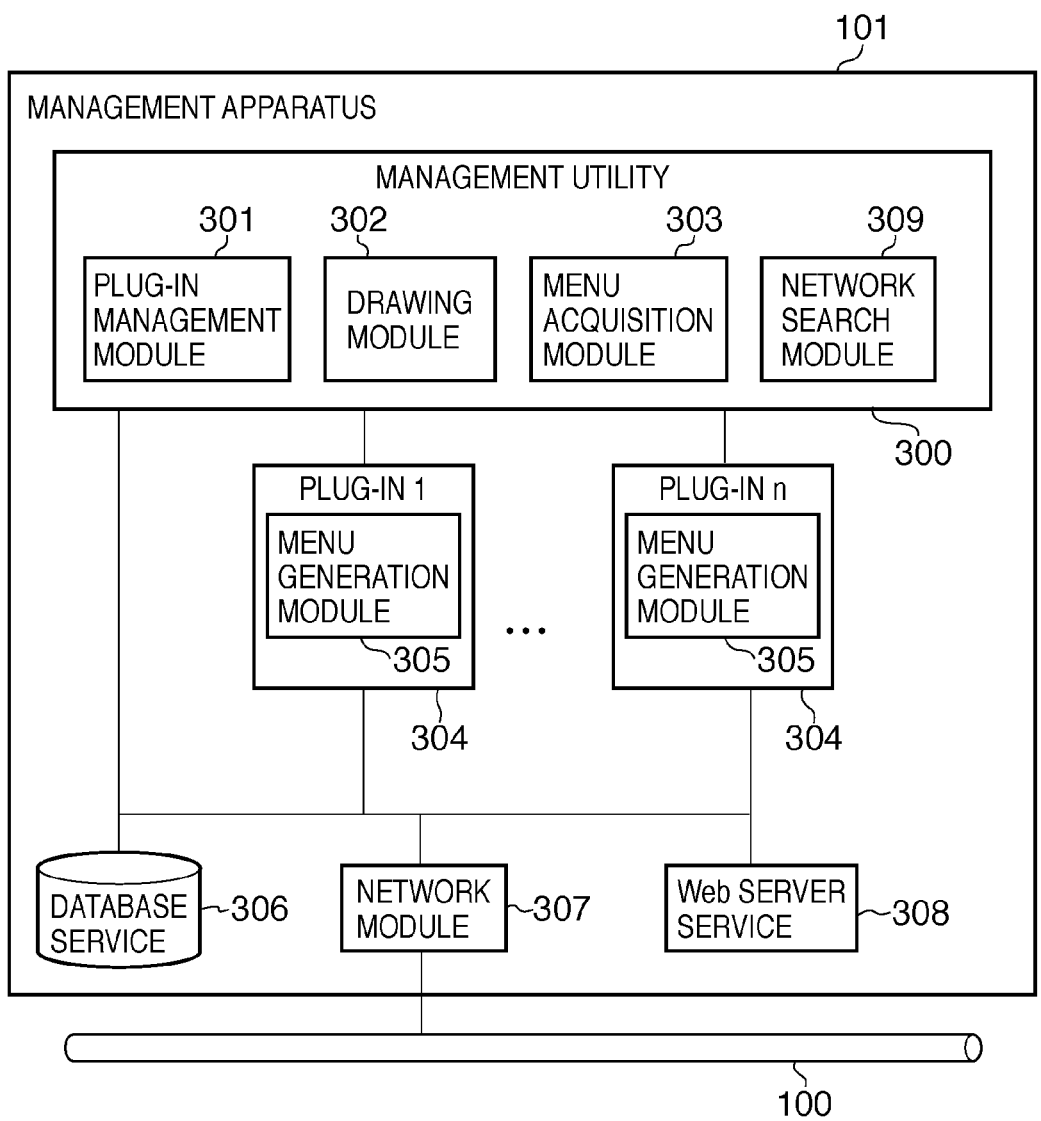

F I G. 11
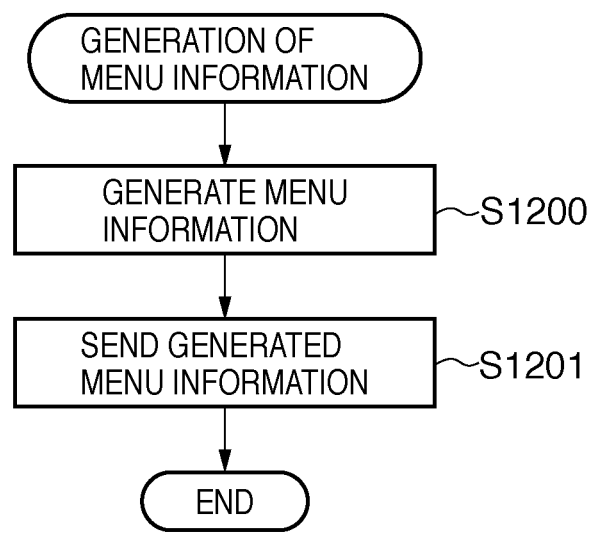

INFORMATION PROCESSING APPARATUS AND CONTROL METHOD

BACKGROUND OF THE INVENTION

1. Field of the Invention

The present invention relates to a technique of dynamically updating apparatus information. More particularly, the present invention relates to a technique of dynamically changing the contents of various menus and the like which pertain to one or more network devices, including an image forming apparatus, and appear on a screen upon clicking an icon or the like corresponding to the network device.

2. Description of the Related Art

Conventionally, contents to be displayed on a menu that appears upon clicking a corresponding icon on the screen are registered in a database service. When displaying the menu, the contents are acquired from the database service. For example, Japanese Patent Laid-Open No. 7-282079 discloses an application in which multimedia information is output from another associated multimedia information.

In a monitoring apparatus that monitors a network device, for example, the function of an existing application is sometimes extended (in particular by adding a function) using a plug-in such as a program. A user may want to change the display contents of the menu in accordance with the addition/deletion of a function by the plug-in, the start/stop of the function, or the state of an object uniquely managed by the plug-in. According to the conventional technique, however, he needs to sequentially acquire and update pieces of information registered in the database service in order to change the display contents of the menu.

When, for example, a user adds a function using a plug-in to an application or the like which manages network devices, it is very cumbersome to sequentially send inquiries to the database service and manually update information. However, Japanese Patent Laid-Open No. 7-282079 does not consider changing display contents at all in response to the addition/deletion of a function by a plug-in, the start/stop of the function, or the state of an object uniquely managed by the plug-in.

SUMMARY OF THE INVENTION

According to one aspect of the present invention, there is provided an information processing apparatus, configured to run an application having a management function for a device wherein the management function can be extended by installing a plug-in, the application comprises a menu acquisition unit which acquires menu information, to be displayed on a management screen to enable selection of the management function by a user; and a drawing unit which generates drawing information of the management screen using the menu information acquired by the menu acquisition unit, and the plug-in comprising a menu information generation unit which generates menu information for enabling execution of the management function extended by the plug-in, and wherein the menu acquisition unit of the application acquires the menu information generated by the menu information generation unit of the installed plug-in and the drawing unit generates drawing information using the acquired menu information generated by the menu information generation unit.

According to another aspect of the present invention, there is provided a control method of controlling an information processing apparatus configured to an application having a management function for a device that can be extended by installing a plug-in, the method comprises a menu information generation step of causing a menu information generating unit of the plug-in installed in the information processing apparatus to generate menu information, to be displayed on a management screen to enable selection of the extended management function by a user, a menu acquisition step of causing the application to acquire the menu information generated by the plug-in; and a generation step of causing the application to generate drawing information for the management screen using the menu information acquired in the menu acquisition step.

According to another aspect of the present invention, there is provided a computer-readable storage medium storing a plug-in program for extending a function of an application which has a management function for a device, wherein the application acquires menu information to be display on a management screen to enable selection of the management function by a user, and generates drawing information for the management screen using the acquired menu information, and wherein upon execution the plug-in program causes a computer to function as a menu information generation unit which generates menu information to be contained in the menu information acquired by the application so as to enable execution of the management function extended by the plug-in.

According to the present invention, when the function of a network device management application is extended by adding a plug-in, corresponding menu information can be dynamically generated to change the display contents without manually rewriting the menu information.

Further features of the present invention will become apparent from the following description of exemplary embodiments (with reference to the attached drawings).

BRIEF DESCRIPTION OF THE DRAWINGS

FIG. 1 is a view exemplifying the configuration of a system according to the present invention;

FIG. 2 is a block diagram exemplifying the hardware configuration of a management apparatus according to the present invention;

FIG. 3 is a block diagram exemplifying the software configuration of the management apparatus according to the present invention;

FIG. 11 is a flowchart of menu information generation processing according to the first embodiment;

DESCRIPTION OF THE EMBODIMENTS

Figure 4:
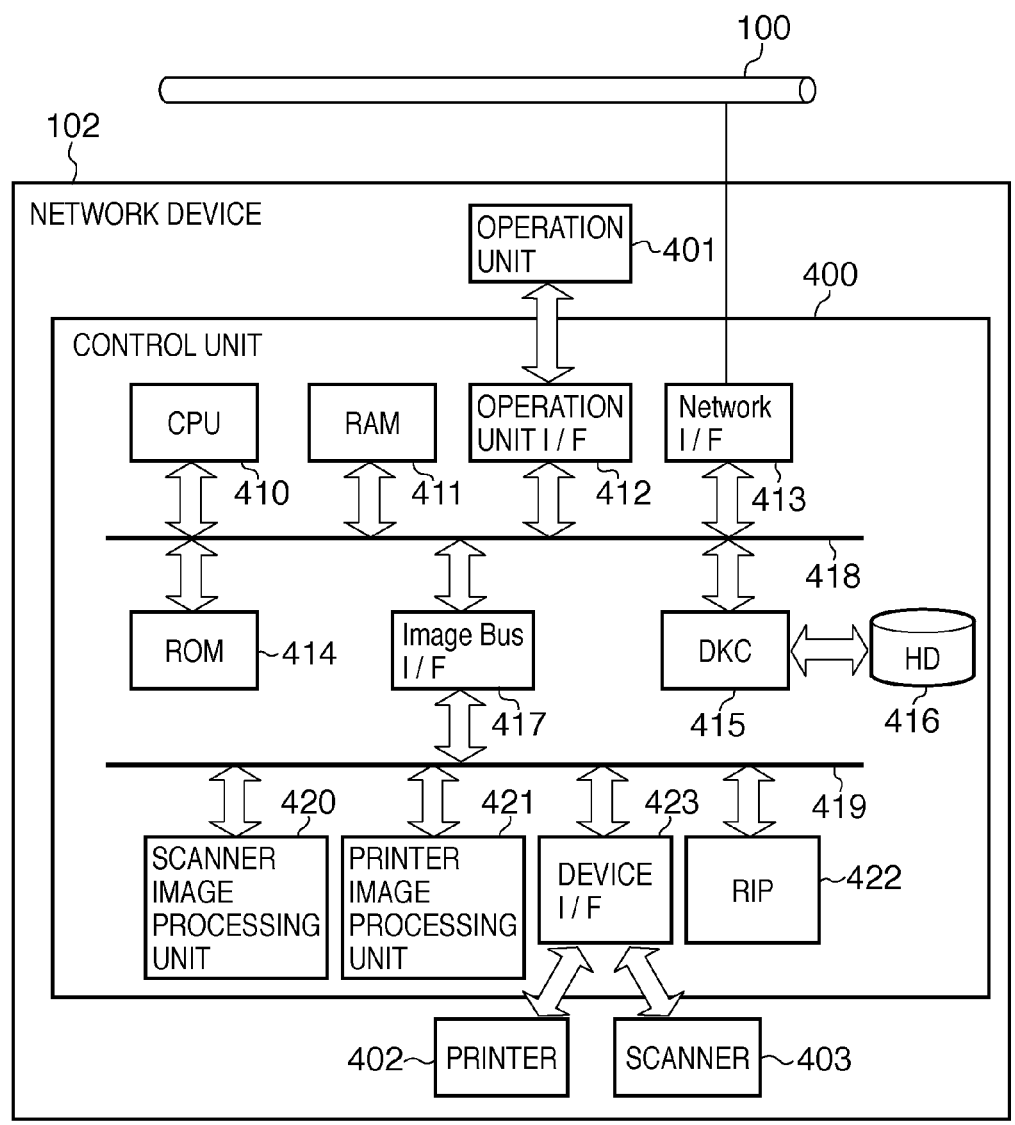
FIG. 4 is a block diagram exemplifying the hardware configuration of a network device according to the present invention.

Embodiments of the present invention will now be described with reference to the accompanying drawings. A network device management system will be used as an example of an information processing apparatus in the embodiments of the present invention.

<First Embodiment>

FIG. 1 is a view showing the configuration of an overall network device management system in the first embodiment. The network device management system shown in FIG. 1 includes a management apparatus 101 that manages network devices connected to each other via a network 100, in particular, network devices 102, and client apparatuses 103 and 104. The management apparatus 101 has an arrangement such as that included in a general personal computer. The client apparatuses 103 and 104 are general personal computers having a browser function and the like. In the following description, the client apparatus 103 which allows a user to utilize a function provided by the management apparatus 101 via the browser function will be called a manipulation client, and the client apparatus 104 managed by the management apparatus 101 will be called a managed client. It is also possible to manage the manipulation client 103 as the managed client 104 and use the managed client 104 as the manipulation client 103. The network devices 102 are devices which are connected to the management apparatus 101 via the network 100 and are manageable by the management apparatus 101, including an MFP (Multi Function Peripheral), printer, and FAX.

The hardware and software configurations of the respective apparatuses that build the network device management system in the present invention will be explained below.

FIG. 2 shows the hardware configuration of the management apparatus 101 and client apparatuses 103 and 104. A system bus 200 is a data exchange path common to the building components of the computer. A CPU (Central Processing Unit) 201 controls the overall computer and performs arithmetic processing and the like. A RAM (Random Access Memory) 202 is an area for storing and executing programs and data when performing processing. A ROM (Read Only Memory) 203 is an area that stores programs such as a system boot program. A DKC (DisK Controller) 204 controls an external storage device such as an HD (Hard Disk) 205. The HD 205 stores programs and data. Programs and data are loaded to the RAM 202 or HD 205, as needed. A network I/F 206 is connected to the network 100 to perform network communication. An input/output I/F 207 is connected to a keyboard, mouse, display, and the like, and inputs/outputs data.

The management apparatus 101 operates while the CPU 201 executes a basic I/O program and OS. The ROM 203 stores the basic I/O program, and the HD 205 stores the OS. When the computer is turned on, an initial program load function in the basic I/O program loads the OS from the HD 205 to the RAM 202, and the OS starts running.

FIG. 3 shows the software configuration of the management apparatus 101. The software of the management apparatus 101 includes a management utility 300, a plurality of plug-ins 304 which can be added and subsequently deleted, a database service 306, a network module 307, and a Web server service 308. By adding the plug-in 304, various functions provided by the plug-in become available. In this case, a function is added to the management utility and becomes usable by it. Note that the software configuration of FIG. 3 is stored as a program in the HD 205 and executed by the CPU 201.

Figure 12A:
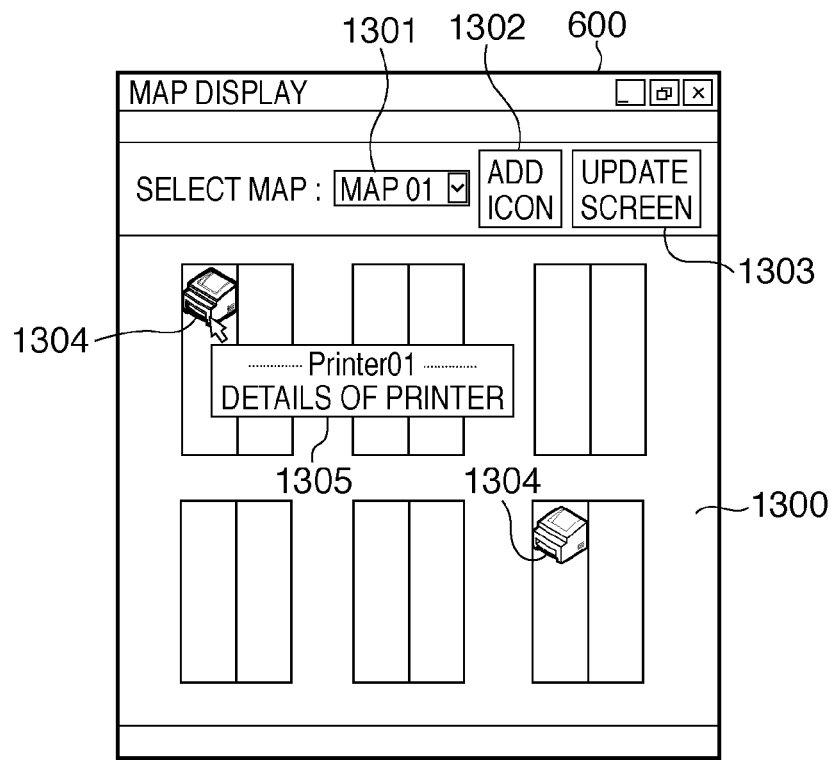
FIGS. 12A and 12B are views exemplifying menu displays according to the first embodiment.

The management utility 300 includes modules such as a plug-in management module 301, drawing module 302, menu acquisition module 303, and network search module 309. Although these modules will be arranged exemplarily and described below, modules are not limited to them and another module may be adopted. The plug-in management module 301 stores, in the HD 205, the file of a plug-in program (to be referred to as a plug-in) added by the user to the management apparatus 101, and registers the plug-in information in the database service 306. The plug-in management module 301 registers, in the database service 306, information for managing the start and stop of each added plug-in so that the plug-in information can be referred to. The plug-in management module 301 can therefore manage even the start/stop of a plug-in together with the addition/deletion of it. The drawing module 302 draws a management screen such as a map representing the arrangement of monitored devices, as shown in FIG. 12A. The drawing module 302 in the embodiment will be explained in regard to drawing of a map assuming a Web application, such as generation of map drawing information, but may be applied to a native application.

The menu acquisition module 303 requests a menu generation module 305 to generate a menu. The menu acquisition module 303 acquires information of a menu (to be referred to as menu information) generated by the menu generation module 305, and transmits the menu information to the drawing module 302. The network search module 309 searches the network-connected network devices 102 and managed client 104 via the network module 307. The network search module 309 acquires setting information and the like from a search target and transfers it to the plug-in 304 and menu generation module 305. If necessary, the plug-in 304 is added to/deleted from the management apparatus 101, and a plurality of plug-ins 304 can be installed, extending the management function of an application. The plug-in 304 includes the menu generation module 305. When a menu unique to a plug-in need not be generated, the plug-in 304 need not contain the menu generation module 305. The menu generation module 305 generates plug-in specific menu information which is displayed upon a user clicking an icon on the map. Menu information is a building element of the menu and is displayed on the map. By selecting menu information, the user can execute a management function indicated by the menu information. The menu generation module 305 is invoked by the menu acquisition module 303 and sends (processed) menu information to the menu acquisition module 303. The database service 306 manages data, and registers and extracts data in response to a request from another module. The database service 306 may reside in a device different from the management apparatus 101 as long as the management utility 300 or plug-in 304 can access the database service 306.

The network module 307 communicates with the network-connected network devices 102 and client apparatuses 103 and 104 via the network 100. The Web server service 308 provides a service of sending back Web page data saved in the HD 205 upon receiving a GET request based on HTTP from the Web browser of the manipulation client 103. The manipulation client 103 is connected from the outside to the management apparatus 101 via the network 100 and can be provided with a service from the Web server service 308. In the management apparatus 101, the management utility 300 is installed in the Web server service 308. The management apparatus 101 functions by executing the management utility 300 and Web server service 308. The management utility 300 is mounted as, for example, a program for executing processing in response to a request to a Web page provided by the Web server service 308. As described above, the management utility 300 operates in cooperation with the Web server service 308 to implement a Web application which manages the network device 102.

FIG. 4 is a block diagram showing the hardware configuration of the network device 102. The network device 102 includes a control unit 400, operation unit 401, printer 402, and scanner 403. The operation unit-related arrangement of the control unit 400 includes a CPU 410, RAM 411, operation unit I/F 412, network I/F 413, ROM 414, DKC (DisK Controller) 415, HD (Hard Disk) 416, image bus I/F 417, and system bus 418. The print/scan-related arrangement of the control unit 400 includes an image bus 419, scanner image processing unit 420, printer image processing unit 421, RIP (Raster Image Processor) 422, and device I/F 423. In this arrangement, the scanner 403 and scanner image processing unit 420 are arranged, as needed. The CPU 410 is a controller that controls the overall control unit 400. The RAM 411 is an image memory for temporarily storing image data. The operation unit I/F 412 is an interface with the operation unit 401 and outputs, to the operation unit 401, image data to be displayed on it. Also, the operation unit I/F 412 transmits information input by the user via the operation unit 401 to the CPU 410.

The network I/F 413 is an interface that is connected to the network 100 and exchanges information with an external apparatus via the network 100. The network I/F 413 includes an MIB (Management Interface Base) which stores various kinds of information of the network device 102. Various kinds of information in the MIB are an IP address, the name and status of a network device, and the like. The ROM 414 is a boot ROM and stores a system boot program. The DKC 415 controls the HD 416. The HD 416 is an external storage device and stores system software and image data.

The image bus I/F 417 is a bus bridge that connects the system bus 418 and image bus 419 and converts data. The system bus 418 is a data exchange path common to the building components of the control unit 400. The image bus 419 is a path that is formed from a PCI bus or IEEE1394 bus and transfers image data at high speed. The scanner image processing unit 420 corrects, processes, and edits an input image. The printer image processing unit 421 performs correction, resolution conversion, and the like for printout image data in accordance with the printer performance. The RIP 422 rasterizes a PDL command sent from the network 100 into a bitmap image. The device I/F 423 connects the printer 402 and scanner 403 serving as image input/output devices to the control unit 400, and converts image data synchronously/asynchronously.

Figure 5:
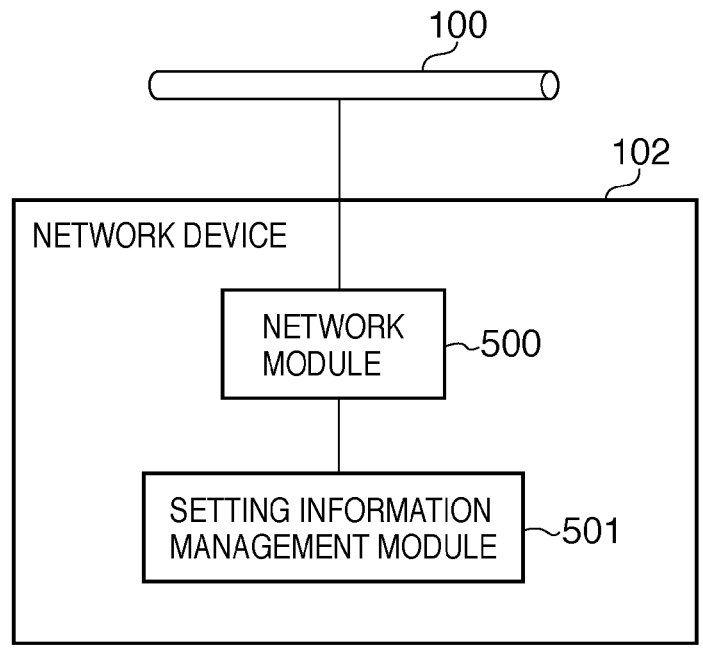
FIG. 5 is a block diagram exemplifying the software configuration of the network device according to the present invention.

FIG. 5 is a block diagram showing the software configuration of the network device 102. A network module 500 interfaces the management apparatus 101 and network device 102 which are connected to the network 100. For example, the network module 500 receives a search request from the management apparatus 101 via the network 100 and requests a setting information management module 501 to acquire setting information necessary for a response. The search request may use any network protocol typified by SNMP, SLP, WSD, or the like. The network module 500 receives setting information acquired from the setting information management module 501 and transmits it as a response to the management apparatus 101 via the network 100. In response to the request received from the network module 500, the setting information management module 501 sends back, to the network module 500, setting information stored in the RAM 411, the HD 416, or the MIB of the network I/F 413.

<Registration of Plug-in Information>

Figure 6:
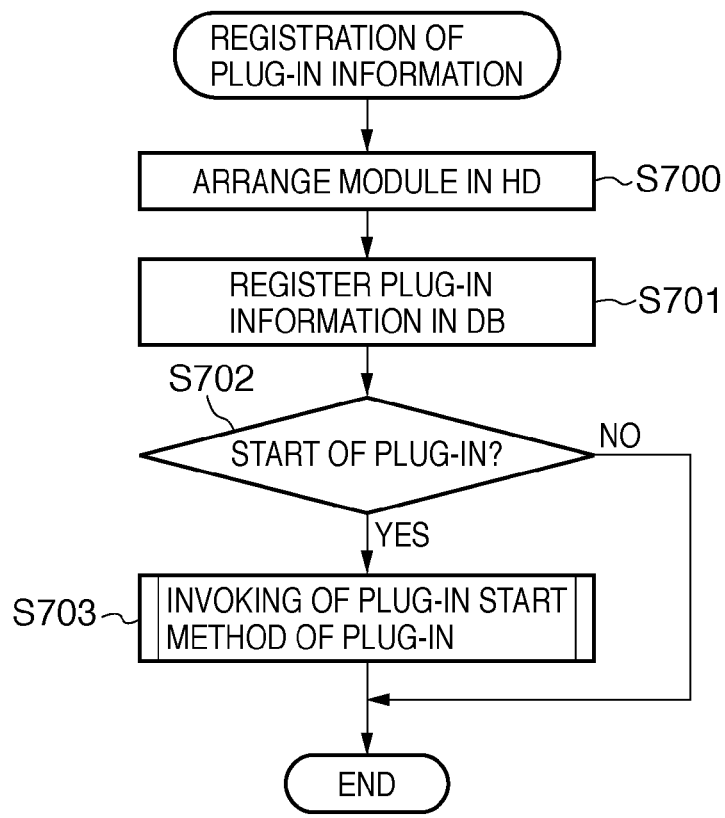
FIG. 6 is a flowchart of plug-in information registration processing according to the first embodiment.

FIG. 6 shows the plug-in information registration operation of the plug-in management module 301 when adding a plug-in to the management apparatus 101. The plug-in management module 301 is the main processor of this operation.

In S700, the plug-in management module 301 arranges, in the HD 205, a plug-in (module) which is uploaded from the user and is to be newly added. In S701, the plug-in management module 301 registers, in the database service 306, plug-in information to be added to the management apparatus 101. In S702, the plug-in management module 301 prompts the user via a UI to determine whether or not to start the added plug-in, and accepts the input. When starting the added plug-in, the plug-in management module 301 invokes a plug-in start method in S703. When not starting the added plug-in, the operation ends while the plug-in remains inactive. In S703, the plug-in management module 301 invokes the plug-in start method of the added plug-in. Details of the plug-in start method will be described with reference to FIG. 7.

<Start of Plug-in>

Figure 7:
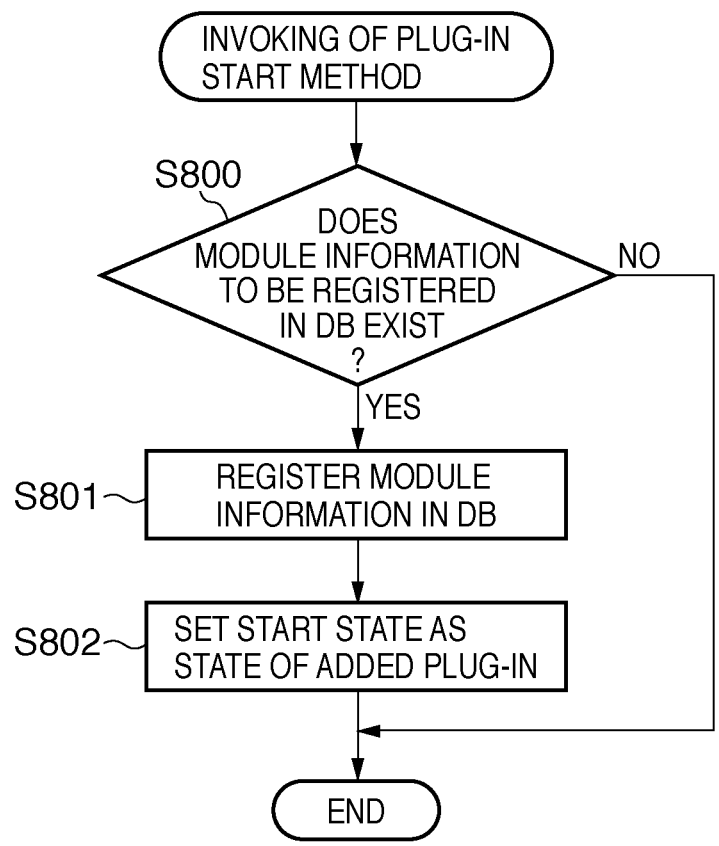
FIG. 7 is a flowchart of processing of a plug-in start method according to the first embodiment.

FIG. 7 shows an operation for changing an added plug-in by itself to be able to start. The plug-in 304 is the main processor of this operation.

In S800, the plug-in itself determines whether it contains a menu generation module 305 to be registered in the database service 306. If the added plug-in contains a menu generation module 305, the plug-in shifts to processing of S801; if NO, ends the operation. In S801, the plug-in registers the (target) menu generation module information in the database service 306. The menu generation module information includes the file position of the menu generation module 305 in the HD 205, and class information used first when the module is invoked. In S802, the added plug-in changes its state managed by the database service 306 to a start state, and ends the operation. For the plug-in in the start state, a menu can be generated in management screen drawing processing.

<Drawing of Management Screen (Map)>

Figure 8:
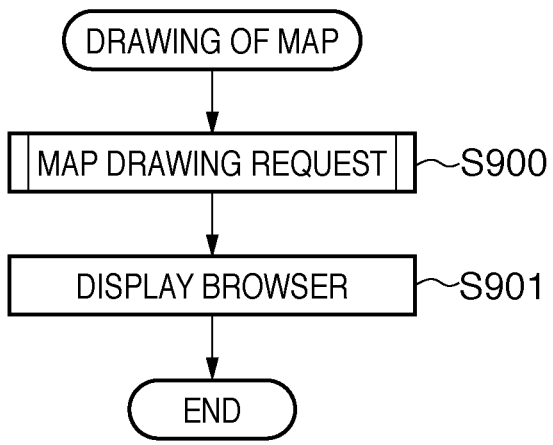
FIG. 8 is a flowchart of screen drawing processing in a client apparatus according to the first embodiment.

FIG. 8 shows an operation for drawing a map including icons to be arranged on the map (management screen) and menus corresponding to the icons in the manipulation client 103. The icons indicate the network devices 102 and managed client 104. It is also possible to manage another management apparatus, projector, power supply, and the like as network devices and display their icons. The manipulation client 103 is the main processor of this operation.

In S900, in response to a user instruction or the like, the manipulation client 103 issues a map drawing request to the drawing module 302 of the management apparatus 101 via the Web browser in order to draw a map. This request will be explained with reference to FIG. 9. In S901, the manipulation client 103 acquires drawing information from the drawing module 302 as a response to the request. Based on the acquired drawing information, the manipulation client 103 draws a map on the Web browser. An example of the acquired drawing information is information described in HTML or XML.

<Drawing Processing>

Figure 9:
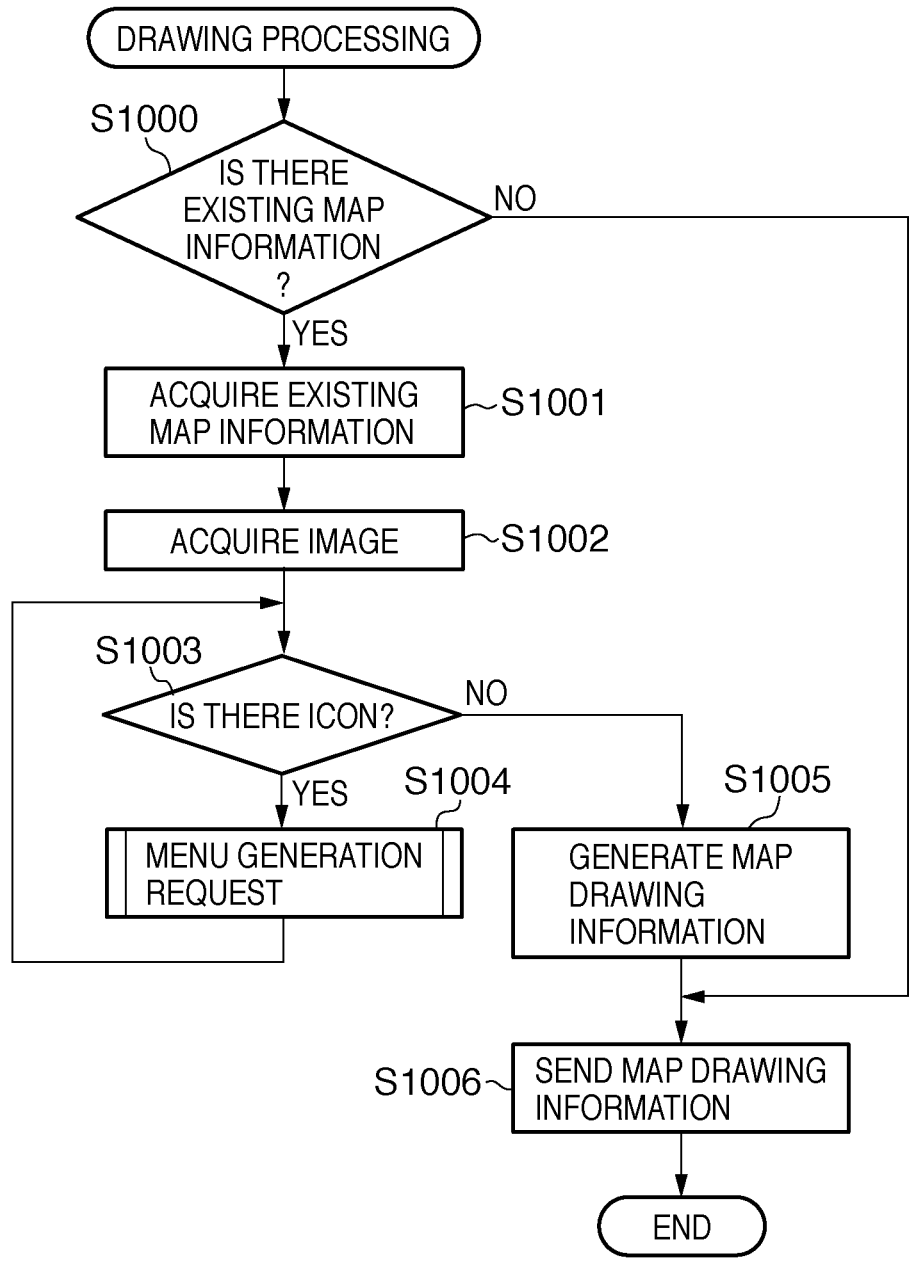
FIG. 9 is a flowchart of processing of a map drawing operation by a drawing module according to the first embodiment.

FIG. 9 shows the operation of the drawing module 302 in response to a map drawing request from the manipulation client 103. The drawing module 302 is the main processor of this operation. This operation starts upon receiving a map drawing request in S900 of FIG. 8.

In S1000, upon receiving a map drawing request, the drawing module 302 determines whether there is map information in the database service 306. The map information means information of the building elements of the map such as information on the save location and file name of a background file used in the map and the size of the file on the map, and information on icons used in the map. If there is map information, the drawing module 302 shifts to processing of S1001. If there is no map information, the drawing module 302 shifts to S1006 to notify the requesting source (manipulation client 103) that there is no map information. In S1001, the drawing module 302 acquires map information from the HD 205 or database service 306. In S1002, the drawing module 302 acquires image information of a background image, icon image, and the like from the HD 205, based on the existing map information acquired in S1001.

In S1003, the drawing module 302 determines whether an icon whose menu has not been generated is arranged in the map. If an icon whose menu has not been generated is arranged in the map, the drawing module 302 shifts to processing of S1004 in order to generate a menu corresponding to the icon. If no icon whose menu has not been generated is arranged in the map information (so if a menu has been generated for each icon arranged in the map information), the drawing module 302 shifts to processing of S1005. In S1004, the drawing module 302 requests the menu acquisition module 303 to generate a menu corresponding to the icon whose menu has not yet been generated. The menu generation processing will be described with reference to FIG. 10. After the end of generating the menu in S1004, the drawing module 302 checks again in S1003 whether another icon whose menu has not been generated is arranged in the map. After generating menus for all icons by repeating S1003 and S1004, the drawing module 302 shifts to map drawing information generation processing in S1005.

In S1005, the drawing module 302 generates drawing information based on map information and generated menu information. The drawing information means information for drawing by the manipulation client 103. In S1006, the drawing module 302 sends, to the requesting manipulation client 103, drawing information for drawing a map.

<Menu Generation Processing>

Figure 10:
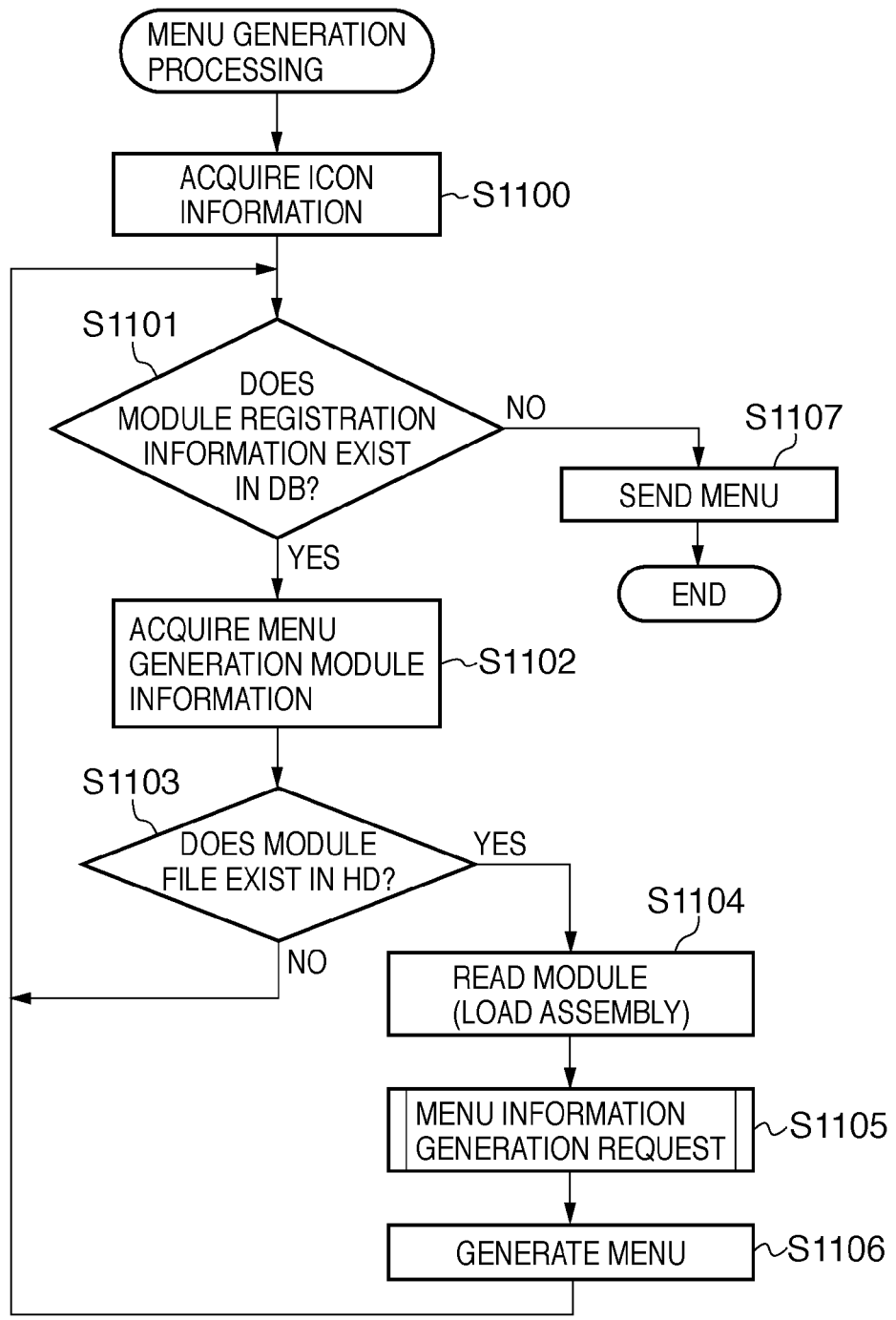
FIG. 10 is a flowchart of menu generation processing according to the first embodiment.

FIG. 10 shows menu generation processing for one icon. The generated menu is formed from menu information generated by the menu generation modules 305 of various plug-ins. The menu acquisition module 303 is the main processor of this operation. This operation starts in response to a menu generation request in S1004 of FIG. 9.

In S1100, the menu acquisition module 303 acquires icon information for generating a menu. The acquired icon information is, for example, an ID or IP address for identifying a managed device.

In S1101, the menu acquisition module 303 determines whether a menu generation module whose menu has not been generated exists among the menu generation modules 305 registered in S801 in the database service 306. If there is a menu generation module whose menu has not been generated, the menu acquisition module 303 shifts to processing of S1102; if NO, to processing of S1107.

In S1102, the menu acquisition module 303 acquires menu generation module information, from the database service 306, of the menu generation module 305 determined in S1101 to exist. The menu generation module information includes the file position of the menu generation module 305 in the HD 205, and class information used first when the module is invoked.

In S1103, the menu acquisition module 303 determines whether a plug-in (module) exists at the file position in the HD 205 that is contained in the module information acquired in S1102. If a plug-in (module) exists, the menu acquisition module 303 shifts to S1104; if NO, to processing of S1101 in order to acquire the next menu generation module information.

In S1104, the menu acquisition module 303 reads information of the plug-in (so including the menu generation module 305), whose menu has not been generated, (as determined in S1103 to exist) from the HD 205. In S1105, the menu acquisition module requests the menu generation module read in S1104 to generate menu information. If the read menu generation module requires icon information, the menu acquisition module issues the request to the read menu generation module together with the icon information acquired in S1100. The menu information generation processing will be described with reference to FIG. 11.

In S1106, the menu acquisition module 303 generates a menu based on the menu information acquired in S1105. The menu information means the display contents of a menu generated by one menu generation module. When another menu generation module has already generated a menu, the existing menu and a newly acquired menu are merged. After the processing of S1106, the menu acquisition module 303 returns to S1101 to acquire information of the next menu generation module whose menu has not been generated. Then, the processes of S1101 to S1106 are repeated. If the menu acquisition module 303 determines in S1101 that all pieces of module information registered in the database service 306 have been processed, it shifts to processing of S1107. In S1107, the menu acquisition module 303 sends the menu generated in S1106 to the requesting source.

<Generation of Menu Information>

FIG. 11 shows the sequence of processing for generating menu information. The menu information described here means contents displayed on the menu, and pieces of menu information can be generated from one plug-in. The menu generation module 305 of each plug-in is the main processor of this operation.

In S1200, the menu generation module 305 generates menu information. In the menu information generation, for example, an IP address registered in icon information is used to generate a URL containing the IP address (see 1305 in FIG. 12B). In S1201, the menu generation module 305 sends the generated menu information to the requesting source (menu acquisition module 303). The URL serving as the generated menu information is used to access a Web page (remote UI) provided by a network device. The Web page allows the user to refer to configuration information, status, and the like of the network device and designate some management functions.

<Example of Map Display>

FIG. 12A exemplifies display of a menu before a plug-in starts. A background image 1300 is an image which is uploaded to the management apparatus 101 and stored in the HD 205. The background image 1300 may be a JPEG or GIF image.

A pull-down menu 1301 allows selecting one of maps. An add button 1302 is used to add an icon to the map. When the user presses the add button 1302, a list of network devices 102 and the like managed by the management apparatus 101 appears. The user can select an icon to be added from the list and add it to an arbitrary position on the map. An update button 1303 is used to update the screen. When the user presses the update button 1303, a map drawing request is issued to the drawing module 302 (S900 in FIG. 8). An icon 1304 is assigned to one network device 102. A menu 1305 appears upon clicking an icon. In FIG. 12A, no plug-in menu is generated, so only a fixed menu (details of a printer) is displayed. From details of a printer, the user can check permanent printer information (IP address) held in advance in the management apparatus 101.

Figure 12B:
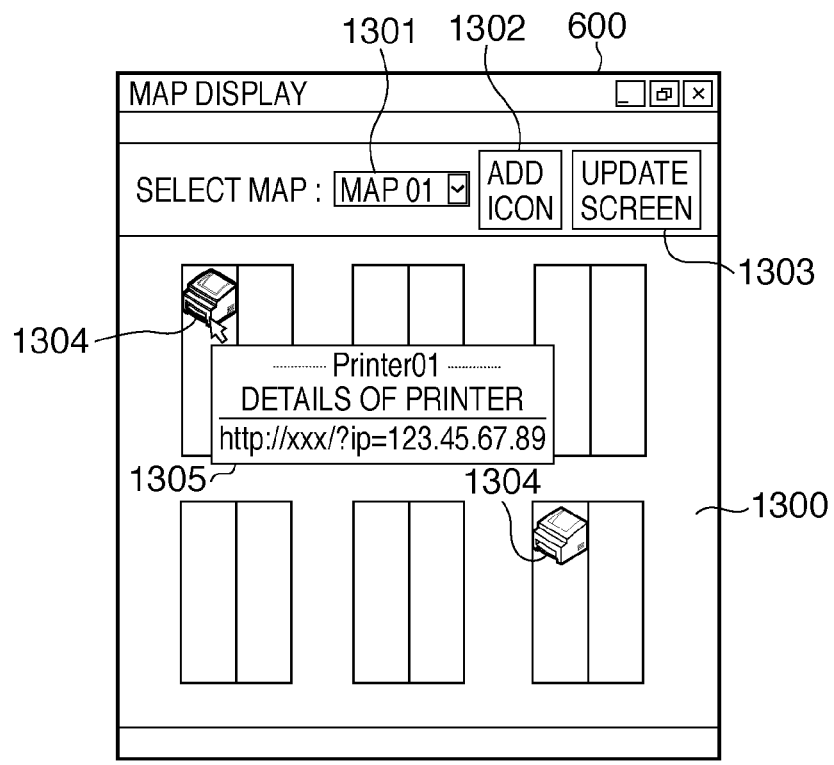

FIG. 12B exemplifies display of a menu after the start of a plug-in. A description of reference numerals 1300 to 1305 is the same as that in FIG. 12A and will not be repeated. In FIG. 12B, the menu 1305 displays a plug-in specific menu (URL information). This is because the processes of S1101 and subsequent steps shown in FIG. 10 have been executed in response to addition of the plug-in and a menu has been added.

In this way, a plug-in can dynamically generate and add a menu and change the display contents in accordance with the installation and start of the plug-in without manually rewriting the contents of the database service. The contents of menus corresponding to many icons can also be easily changed.

<Second Embodiment>

The first embodiment has described registration of a plug-in necessary to display a menu, and menu information generation processing by the menu generation module 305 of the plug-in when displaying a menu.

In the first embodiment, the menu generation module 305 generates a URL containing the IP address of icon information and provides it as menu information. In the menu generation processing, not only icon information is used, but also the configurations and states of the network devices 102 and client apparatuses 103 and 104 are acquired and used. The second embodiment will describe a method of acquiring the state (status) of an object installed in an external device from the external device connected to a network 100 and reflecting it in a menu when generating a menu. A device driver such as a printer driver installed in each apparatus will be exemplified as the object. A menu regarding the operating state of each apparatus may also be generated.

The configuration of the overall system, and the hardware and software configurations of a management apparatus 101, network device 102, and client apparatuses 103 and 104 are the same as those in the first embodiment, and a description thereof will not be repeated. Registration of a plug-in (FIG. 6), drawing of a screen in the client apparatuses 103 and 104 (FIG. 8), the map drawing operation by the drawing module (FIG. 9), and menu generation processing (FIG. 10) are also the same as those in the first embodiment, and a description thereof will not be repeated.

Figure 13:
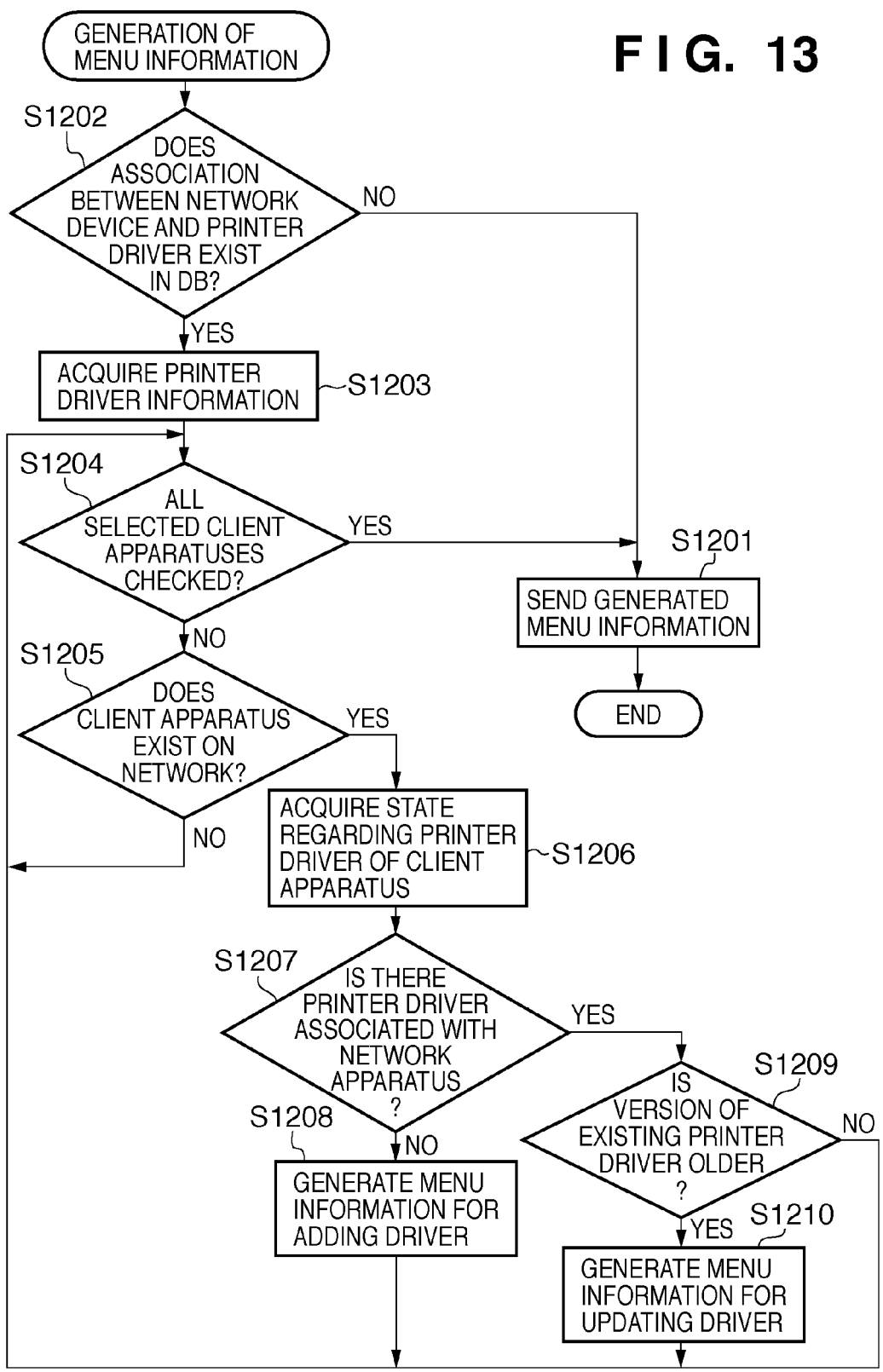
FIG. 13 is a flowchart of menu information generation processing according to the second embodiment.

FIG. 13 shows a menu information generation operation considering information of the managed client 104. A description of S1201 is the same as that in FIG. 11 and thus will not be repeated. The sequence of processing upon adding a management plug-in (to be referred to as a driver management plug-in) for additionally installing a device driver corresponding to the network device 102 in the managed client 104 will be explained as an example. A menu generation module 305 of the driver management plug-in is the main processor of this operation. The operation of the menu generation module 305 will be explained by exemplifying processing for one managed network device on the network. In an environment where three network devices (102) are installed as shown in FIG. 1, this operation is done for each device.

In S1202, the menu generation module 305 determines whether information that associates a network device with a device driver exists in a database service 306 (hereinafter referred to as "association information"). If there is association information, the menu generation module 305 shifts to processing of S1203. If there is no association information, in S1201, the menu generation module 305 sends a message to this effect to the requesting source and ends the operation without generating a menu. When the operation ends without generating a menu, a menu corresponding to an added plug-in is not additionally displayed upon clicking an icon on the map screen.

In S1203, the menu generation module 305 acquires information (to be referred to as "driver information" hereinafter) of the device driver associated with the network device from the database service 306. The menu generation module 305 thus operates as or implements an object information acquisition unit. The object information, here provided in the form of driver information, includes position information of the device driver arranged in an HD 205, and type and version information of the device driver.

In S1204, the menu generation module 305 determines whether all menus have been generated for a selected managed client. The selected managed client is a managed client selected by the user before a map drawing request in S900 when he wants to generate menus for a specific client apparatus. Note that a plurality of managed clients may be selected. If there are selected managed clients for which it is determined in S1204 that menu generation has not been executed, one of such selected managed clients is selected, and then the menu generation module 305 advances to S1205. If there is no such managed client, the menu generation module 305 advances to S1201.

In S1205, the menu generation module 305 determines whether the selected managed client exists on the network. If the selected managed client exists on the network, the menu generation module 305 shifts to processing of S1206. If the selected managed client does not exist on the network, the menu generation module 305 returns to S1204 to process the next selected managed client.

In S1206, the menu generation module 305 acquires a device driver held in the selected managed client and the state of the device driver. The menu generation module thus operates as or implements an object state acquisition unit. In S1207, the menu generation module 305 determines whether the driver information acquired in S1203 contains the device driver of the managed client that has been acquired in S1206. If the driver information acquired in S1203 contains the device driver of the managed client that has been acquired in S1206, the menu generation module 305 shifts to processing of S1209; if NO, to processing of S1208.

In S1208, the menu generation module 305 generates menu information for adding the device driver to the selected managed client. The menu information generated here may be one for displaying a link for downloading the driver in S1203 or one for installing the driver directly in the selected managed client. In S1209, the menu generation module 305 compares the version of the device driver present in the managed client determined in S1207 with version information contained in the driver information acquired in S1203. If the version is older than the version information, the menu generation module 305 shifts to processing of S1210; if NO, to processing of S1204 for the next selected managed client. In S1210, the menu generation module 305 generates menu information for updating the device driver of the selected managed client. The menu information generated here is, for example, one for displaying a link for updating the driver in S1203.

After the end of the menu information generation processing in S1208 or S1210, the menu generation module 305 returns to S1204 to shift to processing for the next selected managed client.

Figure 14:
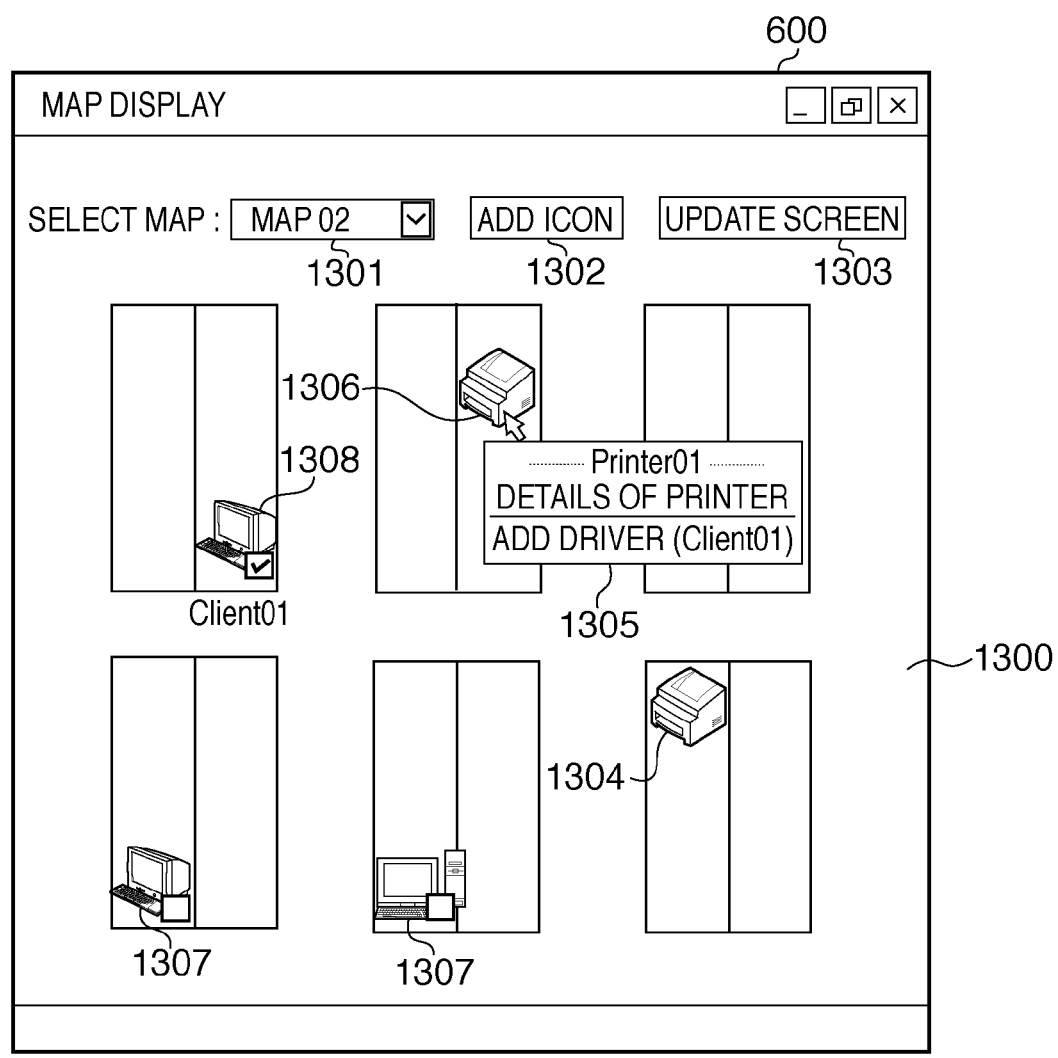
FIG. 14 is a view exemplifying a menu display according to the second embodiment.

FIG. 14 exemplifies display of a menu in the second embodiment. A description of reference numerals 1300 to 1305 is the same as that in FIG. 12A and thus will not be repeated. An icon 1306 is an icon (to be referred to as a network device icon) assigned to one network device. This icon is named "Printer01". Icons 1307 and 1308 are icons (to be referred to as client apparatus icons) assigned to managed clients. These icons have check boxes. The client apparatus icon 1308 checked in the check box is subjected to the processing of S1204 in FIG. 13 as a managed client selected by the user. This display example assumes that a device driver corresponding to the network device icon 1306 has not been installed in the client apparatus icon 1308.

When the user clicks the network device icon 1306 on the map, a menu containing menu information "add driver (Client01)" appears. This menu is menu information newly displayed in response to addition of a driver management plug-in, as described with reference to FIG. 13. As is apparent from this display example, the user has not installed the printer driver of Printer01 (i.e., a network device indicated by the icon 1306) in Client01 (i.e., client device indicated by the icon 1308). The display example represents that the user can install (add) the printer driver of Printer01 in Client01 by selecting "add driver (Client01)" from the menu.

In some cases, a menu including two pieces of menu information "add driver (Client01)" and "update driver (Client02)" appears upon clicking another network device icon on the map. This menu is also menu information newly displayed in response to addition of a driver management plug-in in FIG. 13. More specifically, menu information generated in S1208 or S1210 is added in this operation.

As described above, according to the second embodiment, a menu to be displayed is generated based on menu information corresponding to an added plug-in by taking account of the state of a device connected to the network 100. When a plug-in for managing and distributing firmware and resources is added in distributing firmware and resources to a network device, a menu reflecting the state of the network device may be generated in the same manner. The second embodiment is also applicable to an asset information display menu based on an asset management plug-in for managing assets, and a distribution menu based on an application management plug-in for distributing an application.

<Third Embodiment>

The above embodiments have described a registration plug-in and generation of a menu necessary for displaying a menu on the map in drawing a screen. Drawing a screen means re-drawing an entire screen displayed on the manipulation client 103 upon screen transition or the like. Generation of a menu according to the present invention is not limited to that executed in drawing a screen but may also be done upon clicking an icon on the map of the screen displayed on the manipulation client 103 by the user. The third embodiment will describe generation of a menu upon clicking an icon by the user.

The configuration of the overall system, and the hardware and software configurations of a management apparatus 101, network device 102, and client apparatuses 103 and 104 are the same as those in the first embodiment, and a description thereof will not be repeated. Registration of a plug-in (FIG. 6), the map drawing operation by the drawing module (FIG. 9), and subsequent processing are also the same as those in the first embodiment, and a description thereof will not be repeated.

Figure 15:
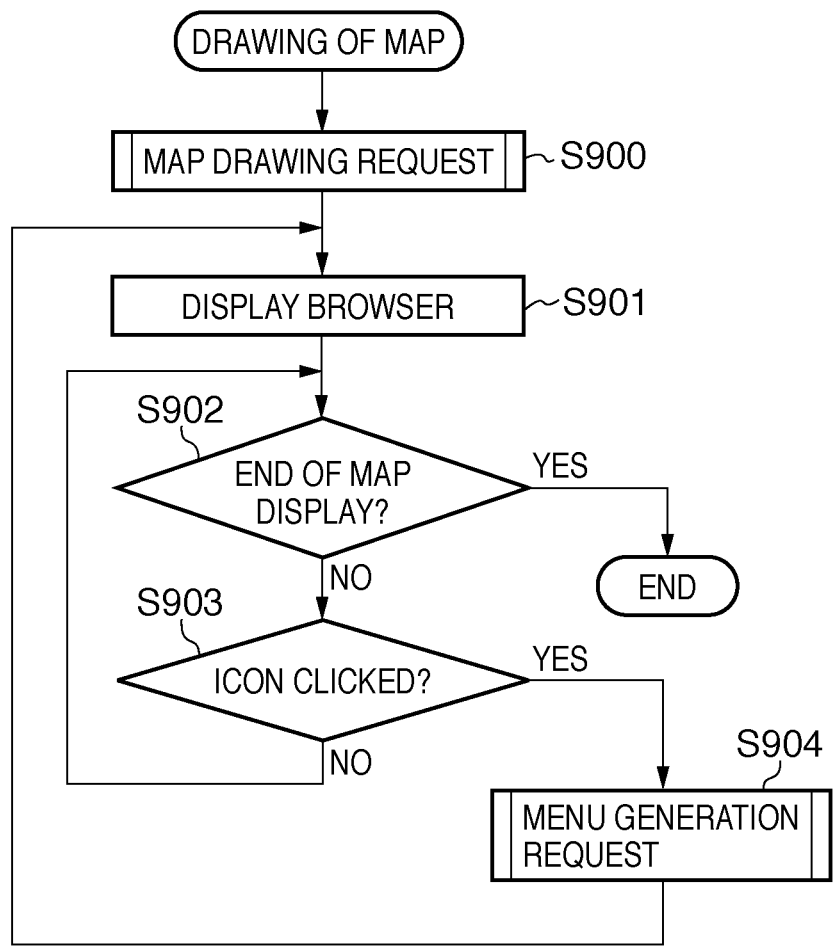
FIG. 15 is a flowchart of processing of a map drawing operation by a drawing module according to the third embodiment.

FIG. 15 shows display processing executed when the user clicks an icon. A (user) manipulation client is the main processor of this operation. Note that S900 and S901 are the same as those in FIG. 8 in the first embodiment, so a description thereof will not be repeated.

In S902, the manipulation client 103 determines whether the display of a map indicating the icons of the network devices 102 and managed client 104 has ended. If the display of the map has ended, the manipulation client 103 ends the processing; if it continues, shifts to the next processing. In S903, the manipulation client 103 determines whether the user has clicked an icon. If the user has clicked an icon, the manipulation client 103 shifts to processing of S904; if NO, to S902 to determine whether the display of the map has ended. Note that S903 may be executed as asynchronous communication of Java Script® which typifies Ajax or event processing because of processing generated upon clicking. In S904, the manipulation client 103 requests the management apparatus 101 to generate a menu for the icon clicked by the user. Generation of the menu is the same as that described in the first embodiment with reference to FIG. 10, and a description thereof will not be repeated. Upon completion of processing of S904, the manipulation client 103 returns to S901.

By this processing, a menu displayed on the map can be generated or updated at an arbitrary timing by the user (so the user can control when a menu is generated or updated).

<Fourth Embodiment>

In the foregoing embodiments, the same menu is displayed for all users. The fourth embodiment will describe processing of changing the menu display in accordance with a management range set for each user.

The configuration of the overall system, and the hardware and software configurations of a management apparatus 101, network device 102, and client apparatuses 103 and 104 are the same as those in the first embodiment, and a description thereof will not be repeated. Registration of a plug-in (FIG. 6), the map drawing operation by the drawing module (FIG. 9), and generation of menu information by a menu generation module 305 (FIGS. 11 and 13) are the same as those in the first and second embodiments, and a description thereof will not be repeated.

Figure 16:
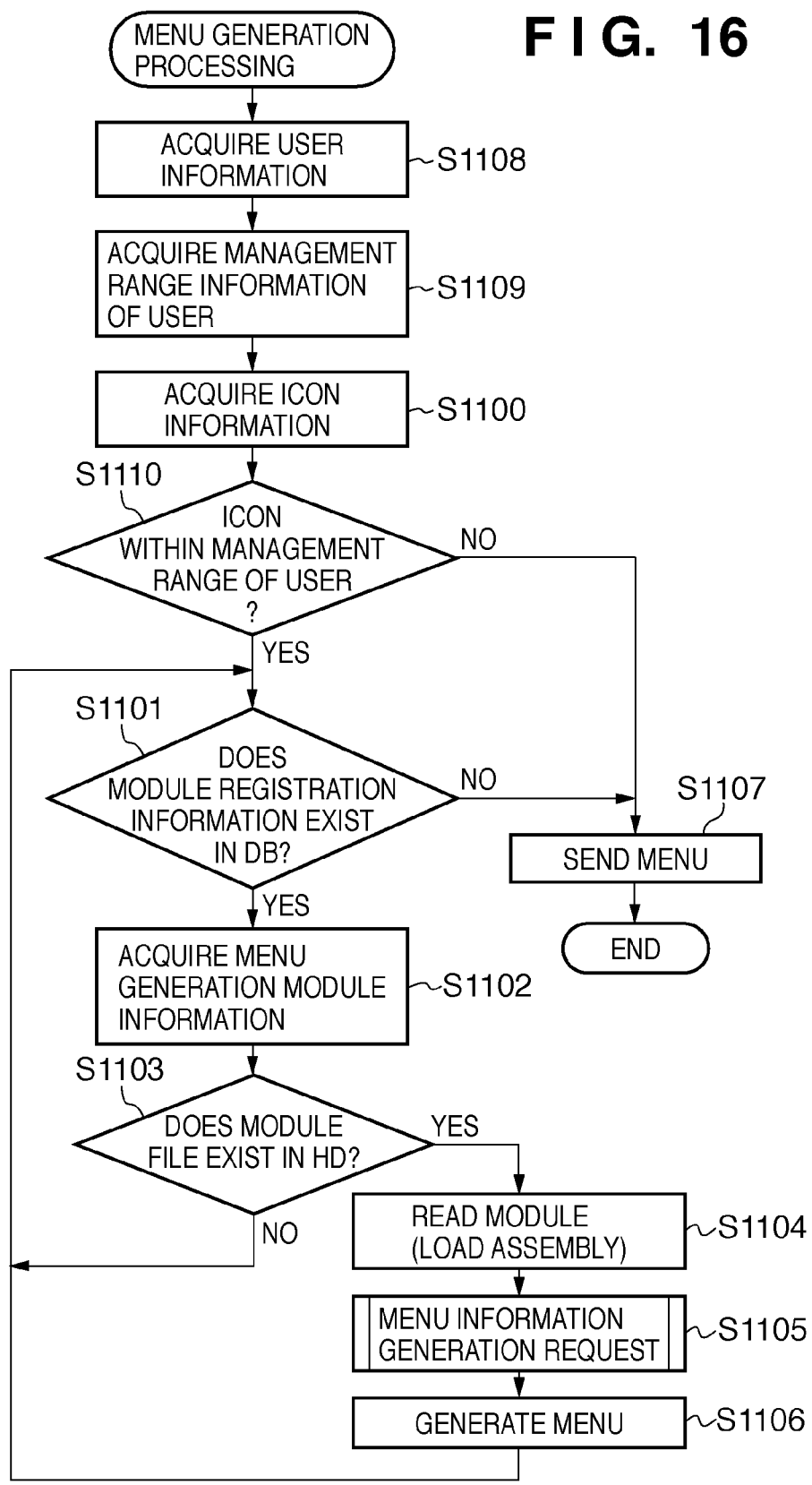
FIG. 16 is a flowchart of menu generation processing according to the fourth embodiment.

Processing of changing a menu displayed on the map in accordance with a management range set for a user will be explained with reference to FIG. 16. Note that S1100 to S1107 are the same as those in FIG. 10, so a description thereof will not be repeated.

In S1108, a menu acquisition module 303 instructed to generate a menu acquires user information on a user, such as the user name and right. The menu acquisition module thus operates as or implements a user information acquisition unit. In S1109, management range information set on the map for each user is acquired from a database service 306. An example of the management range information is map coordinates indicating a management range set for a user. When management range information is registered for none of users or rights (so management range information is not registered for a user name or a right), the entire map is defined as a management range. The menu acquisition module thus operates as or implements a management range information acquisition unit.

In S1110, it is determined using the pieces of information acquired in S1108, S1109, and S1100 whether an icon exists in the management range managed by the user. If an icon exists in the management range, a menu is generated for each module by processes in S1101 and subsequent steps. If an icon does not exist in the range, the processing ends. If there is a menu to be always displayed, menu generation processing may be executed before the end of processing.

Figure 17:
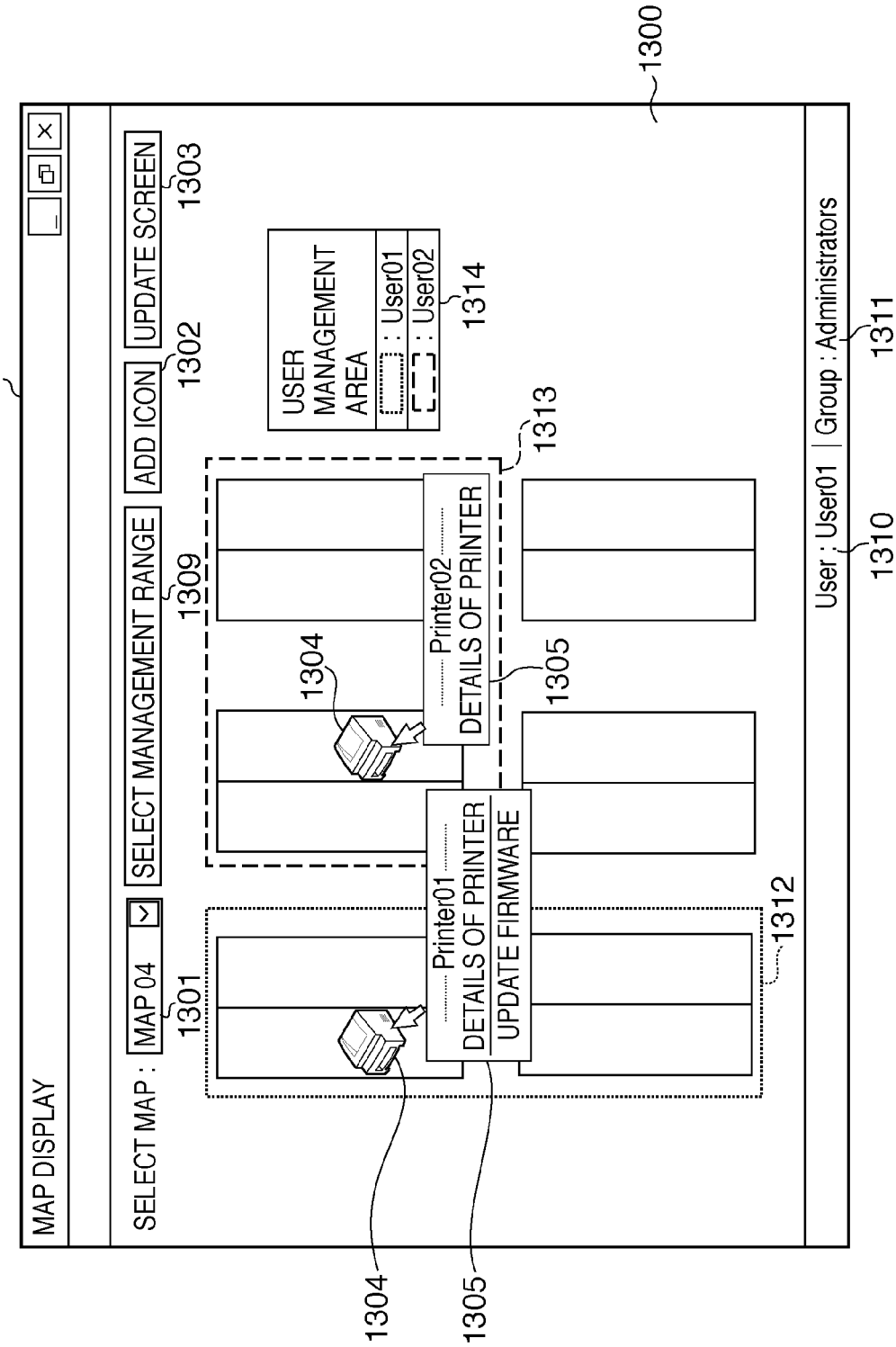
FIG. 17 is a view exemplifying a menu display according to the fourth embodiment.

FIG. 17 exemplifies display of a change of the menu based on a management range set for each user. Note that reference numerals 1300 to 1308 are the same as those in FIG. 12A and FIG. 14, so a description thereof will not be repeated. A management range selection button 1309 is used to select a management range. The management range selection processing is executed according to the following sequence. More specifically, a user presses the management range selection button to display a selection box which allows him to designate a selection range. Then, the current user designates a range he wants to manage. An area 1310 displays the name of a user who manipulates the management apparatus 101. An area 1311 displays a right assigned to a user whose name is displayed in the area 1310. Areas 1312 and 1313 display management ranges selected by respective users. The area 1312 indicates a range managed by User01, and the area 1313 indicates a range managed by User02. An area 1314 displays an explanatory note describing a user and a management range assigned to him.

In this display example, "User01" having the administrator right manipulates the management apparatus 101, as indicated by the areas 1310 and 1311. In this case, a menu executable with only the administrator right is displayed, including update of firmware in a printer in the management range of "User01". For example, when "User02" manipulates the management apparatus 101 and clicks "Printer01", the menu "update firmware" does not appear. In this example, a menu "details of a printer" is displayed for even a user falling outside the management range.

By this processing, the menu display can be changed in accordance with a management range set for each user. The management range is designated by the user name in the fourth embodiment, but may be designated by the right given to the user.

<Other Embodiments>

Aspects of the present invention can also be realized by a computer of a system or apparatus (or devices such as a CPU or MPU) that reads out and executes a program, carried on a carrier medium, to perform the functions of the above-described embodiment(s), and by a method, the steps of which are performed by a computer of a system or apparatus by, for example, reading out and executing a program carried on a carrier medium to perform the functions of the above-described embodiment(s). The program may be carried on a carrier medium such as a computer readable storage medium or a transmission medium (signal). For this purpose, the program is provided to the computer for example via a network or from a recording medium of various types serving as the memory device (e.g., computer-readable medium).

According to an embodiment of the present invention, upon receiving a menu display request, a plug-in (304) dynamically generates a menu. The menu generation module (305) of the plug-in (304) generates the contents of the menu. Each plug-in (304) has specific menu generation processing. The contents of menus generated by respective plug-ins (304) are merged to display the menu.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No.2009-099405, filed Apr. 15, 2009, which is hereby incorporated by reference herein in its entirety.

What is claimed is:

1. An information processing apparatus for providing a service to a manipulation client upon receiving a request based on HTTP from a Web browser of the manipulation client via a network, comprising:
    at least a processor and memory, cooperating to run an application having a management function for a device on the network wherein the management function can be extended by installing a plug-in that extends a function of managing a device driver for the device,
    said application comprising:
        a menu acquisition unit that acquires menu information, to be displayed on a management screen to enable selection of the management function by a user of the manipulation client upon receiving a drawing request of the management screen from the manipulation client via the network;
        a drawing unit that generates drawing information of the management screen using the menu information acquired by said menu acquisition unit; and
        a transmitting unit that transmits the generated drawing information of the management screen to the manipulation client,
    said plug-in comprising:
        a menu information generation unit that generates menu information for enabling execution of the management function extended by said plug-in,
        wherein said menu information generation unit is also configured to acquire information of the device driver managed by said plug-in, and
        wherein said menu information generation unit of said plug-in generates menu information corresponding to a function for adding the device driver to a client as the management function based on the acquired information of the device driver, when an association between the device and the device driver exists in a database service,
    wherein said menu acquisition unit of said application acquires the menu information generated by said menu information generation unit of the installed plug-in and said drawing unit generates drawing information using the acquired menu information generated by said menu information generation unit.

2. The apparatus according to claim 1, wherein said menu information generation unit of said plug-in generates menu information in accordance with an icon designated by a user, wherein the icon is presented on a management screen displayed based on drawing information generated by said drawing unit of said application.

3. The apparatus according to claim 1, wherein
    said menu acquisition unit of the application further acquires user information of the user, and acquires management range information of the device corresponding to the acquired user information, and
    said drawing unit of said application generates drawing information by using a menu containing the menu information, as generated by said menu information generation unit of said plug-in, for a device falling within a management range of the user, and by using a menu not containing the menu information, as generated by said menu information generation unit of said plug-in, for a device falling outside the management range of the user, based on the acquired management range information.

4. A control method of controlling an information processing apparatus for providing a service to a manipulation client upon receiving a request based on HTTP from a Web browser of the manipulation client via a network, configured to run an application having a management function for a device on the network that can be extended by installing a plug-in that extends a function of managing a device driver for the device, the method comprising:
- a step, performed by a menu information generating unit of the plug-in installed in the information processing apparatus, of generating menu information, to be displayed on a management screen to enable selection of the extended management function by a user;
- a step, performed by the application, of acquiring the menu information generated by the plug-in of the manipulation client upon receiving a drawing request of the management screen from the manipulation client via the network;
- a step, performed by the application, of generating drawing information for the management screen using the acquired menu information; and
- a step, performed by the application, of transmitting the generated drawing information of the management screen to the manipulation client,
- a step, performed by the menu information generation unit, of acquiring information of the device driver managed by the plug-in; and
- a step, performed by the menu information generation unit, of generating menu information corresponding to a function for adding the device driver to a client as the management function based on the acquired information of the device driver, when an association between the device and the device driver exists in a database service.

5. A non-transitory computer-readable storage medium for providing a service to a manipulation client upon receiving a request based on HTTP from a Web browser of the manipulation client via a network, storing a plug-in program for extending a function of an application that has a management function for a device on the network that extends a function of managing a device driver for the device,
- wherein the application acquires menu information to be displayed on a management screen to enable selection of the management function by a user of the manipulation client upon receiving a drawing request of the management screen from the manipulation client via the network,
- a drawing unit generates drawing information of the management screen using the acquired menu information acquired by the menu acquisition unit, and
- a transmitting unit transmits the generated drawing information of the management screen to the manipulation client,
- upon execution the plug-in program causes a computer to function as a menu information generation unit generates menu information for enabling execution of the management function extended by the plug-in,
- wherein the menu information generation unit also acquires information of the device driver managed by the plug-in, and
- wherein the menu information generation unit of the plug-in generates menu information corresponding to a function for adding the device driver to a client as the management function based on the acquired information of the device driver, when an association between the device and the device driver exists in a database service.

6. An information processing apparatus for providing a service to a manipulation client upon receiving a request based on HTTP from a Web browser of the manipulation client via a network, wherein the information processing apparatus is configured to run an application having a management function for a device on the network wherein the management function can be extended by installing a plug-in,
said application comprising:
- a menu acquisition unit that acquires menu information, to be displayed on a management screen to enable selection of the management function by a user of the manipulation client upon receiving a drawing request of the management screen from the manipulation client via the network;
- a drawing unit that generates drawing information of the management screen using the menu information acquired by said menu acquisition unit; and
- a transmitting unit that transmits the generated drawing information of the management screen to the manipulation client, and said plug-in comprising:
- a menu information generation unit that generates menu information for enabling execution of the management function extended by said plug-in, and
- wherein said menu acquisition unit of said application acquires the menu information generated by said menu information generation unit of the installed plug-in,
- wherein said menu acquisition unit of said application further acquires user information of the user, and acquires management range information of the device corresponding to the acquired user information,
- wherein said drawing unit of the application generates drawing information by using a menu containing the menu information, as generated by said menu information generation unit of said plug-in, for a device falling within a management range of the user, and by using a menu not containing the menu information, as generated by said menu information generation unit of said plug-in, for a device falling outside the management range of the user, based on the acquired management range information, and
- wherein the management screen indicates a map in which an icon corresponding to the device is arranged.

7. The apparatus according to claim 6, wherein said menu information generation unit of said plug-in is also configured to operate as an object information acquisition unit that acquires information of an object managed by the plug-in, and to operate as an object state acquisition unit that acquires a current state of an object of a device to be managed, and
- wherein said menu information generation unit of said plug-in generates menu information corresponding to a management function to be applied to the device to be managed, based on the acquired information of the object managed by said plug-in and the acquired current state of the object of the device to be managed.

8. The apparatus according to claim 7, wherein said plug-in is a plug-in that extends a function of managing firmware or a resource of the device, and the object is the firmware or the resource.

9. A control method of controlling an information processing apparatus for providing a service to a manipulation client upon receiving a request based on HTTP from a Web browser of the manipulation client via a network, wherein the information processing apparatus is configured to run an application having a management function for a device that can be extended by installing a plug-in, the method comprising:

a step, performed by a menu acquisition unit, of acquiring menu information, to be displayed on a management screen to enable selection of the management function by a user of the manipulation client upon receiving a drawing request of the management screen from the manipulation client via the network;

a step, performed by a drawing unit, of generating drawing information of the management screen using the menu information acquired in said menu acquisition step;

a step, performed by a transmitting unit, of transmitting the generated drawing information of the management screen to the manipulation client; and a step, performed by a menu information generation unit, of generating menu information for enabling execution of the management function extended by the plug-in, wherein the menu acquisition unit of the application also performs a step of acquiring the menu information generated by the menu information generation unit of the installed plug-in, wherein the menu acquisition unit of the application further acquires user information of the user, and acquires management range information of the device corresponding to the acquired user information, wherein the drawing unit of the application generates drawing information by using a menu containing the menu information, as generated by the menu information generation unit of the plug-in, for a device falling within a management range of the user, and by using a menu not containing the menu information, as generated by the menu information generation unit of the plug-in, for a device falling outside the management range of the user, based on the acquired management range information, and wherein the management screen indicates a map in which an icon corresponding to the device is arranged.

10. A non-transitory computer-readable storage medium for providing a service to a manipulation client upon receiving a request based on HTTP from a Web browser of the manipulation client via a network, wherein the information processing apparatus is storing a plug-in program for extending a function of an application that has a management function for a device that extends a function of managing a device driver for the device, said application comprising:
  a menu acquisition unit that acquires menu information, to be displayed on a management screen to enable selection of the management function by a user of the manipulation client upon receiving a drawing request of the management screen from the manipulation client via the network;
  a drawing unit that generates drawing information of the management screen using the menu information acquired by said menu acquisition unit, and
  a transmitting unit that transmits the generated drawing information of the management screen to the manipulation client, and said plug-in comprising:
  a menu information generation unit that generates menu information for enabling execution of the management function extended by said plug-in, and wherein said menu acquisition unit of said application acquires the menu information generated by said menu information generation unit of the installed plug-in, wherein said menu acquisition unit of said application further acquires user information of the user, and acquires management range information of the device corresponding to the acquired user information, wherein said drawing unit of the application generates drawing information by using a menu containing the menu information, as generated by said menu information generation unit of said plug-in, for a device falling within a management range of the user, and by using a menu not containing the menu information, as generated by said menu information generation unit of said plug-in, for a device falling outside the management range of the user, based on the acquired management range information, and wherein the management screen indicates a map in which an icon corresponding to the device is arranged.

* * * * *